(12) United States Patent
Börjeson et al.

(10) Patent No.: US 7,501,792 B2
(45) Date of Patent: Mar. 10, 2009

(54) CHARGING CABLE WITH USB-LIKE CONNECTOR

(75) Inventors: Henrik Börjeson, Lund (SE); Jan Nilsson, Harlösa (SE)

(73) Assignee: Sony Ericsson Mobile Communications AB, Lund (SE)

( * ) Notice: Subject to any disclaimer, the term of this patent is extended or adjusted under 35 U.S.C. 154(b) by 10 days.

(21) Appl. No.: 11/735,671

(22) Filed: Apr. 16, 2007

(65) Prior Publication Data

US 2008/0224658 A1 Sep. 18, 2008

Related U.S. Application Data

(60) Provisional application No. 60/894,768, filed on Mar. 14, 2007.

(51) Int. Cl.
*H02J 7/00* (2006.01)
(52) U.S. Cl. ........................ 320/106; 320/114
(58) Field of Classification Search .......... 320/106–107
See application file for complete search history.

(56) References Cited

U.S. PATENT DOCUMENTS

2004/0204177 A1 10/2004 Pon

2006/0181241 A1* 8/2006 Veselic ........................ 320/107
2007/0046268 A1 3/2007 Irie

FOREIGN PATENT DOCUMENTS

EP 1 691 252 A1 8/2006

* cited by examiner

*Primary Examiner*—Adolf Berhane
*Assistant Examiner*—Samuel Berhanu
(74) *Attorney, Agent, or Firm*—Harrity & Harrity, LLP

(57) ABSTRACT

A charging-cable includes a charger-connector for connecting the charging-cable to a USB connector in a charger, and a device-connector for connecting the charging-cable to a portable device. The charger-connector includes USB-terminals arranged so that a first USB-terminal can connect to the $V_{BUS}$ signal, a second USB-terminal can connect to the $D_-$ signal, a third USB-terminal can connect to the $D_+$ signal and a fourth USB-terminal can connect to the ground signal of a USB connector. The device-connector includes device-terminals connected to the portable device so that a first device-terminal connects to a ground terminal and a second device-terminal connects to a charging terminal of the portable device. Moreover, the first USB-terminal is connected to one of the second or third USB-terminals via a first circuit. Furthermore, the other of the second or third USB-terminals is connected to the second device-terminal via a third circuit.

6 Claims, 7 Drawing Sheets

| Pin | Signal |
|---|---|
| 1 | USB +5V in |
| 2 | |
| 3 | |
| 4 | |
| 5 | |
| 6 | |
| 7 | |
| 8 | |
| 9 | GND |
| 10 | USB DATA + |
| 11 | USB DATA - |
| 12 | Charge In |

Fig. 2a

| Pin | Signal |
|---|---|
| 1 | $V_{BUS}$ |
| 2 | D- |
| 3 | D+ |
| 4 | GND |

Fig. 2b

PRIOR ART

CHARGING CABLE WITH USB-LIKE CONNECTOR

RELATED APPLICATIONS

The application claims priority from U.S. Provisional Application Ser. No. 60/894,768 filed Mar. 14, 2007, entitled "Charging Cable with USB-Like Connector", the contents of which are hereby incorporated by reference.

TECHNICAL FIELD

The present invention is directed to power supply of portable devices. Particular aspects of the invention are directed to power supply of portable devices via a charging cable with a USB-like connector. Even more particular aspects are directed to the charging of a power source in a wireless portable device via a charging cable with a USB-like connector.

BACKGROUND OF THE INVENTION

In recent years, the Universal Serial Bus (USB) has become one of the most widely used methods for interconnecting electronic devices. The USB standard is, e.g., available from www.usb.org. Originally USB was used to interconnect computers to various standard peripheral devices. However, deployment of the USB standard has grown to support a vast array of devices and in particularly portable devices such as e.g. cellular phones, personal digital assistants (PDAs), cameras and personal music players etc.

Logically, the USB standard provides a system with an inverted tree-like structure. The top of the tree (i.e., at the root since the tree is inverted) comprises the USB host to which a plurality of USB devices can be connected. If more USB devices are required, a USB hub may be used. A USB hub may be further connected to its own set of USB devices or USB hubs as necessary. The USB connections between the USB host, the USB hubs and the USB devices allow data to flow between the USB host and USB devices.

Physically, the USB standard is based on a serial bus comprising a pair of twisted wires for communicating two data signals labeled $D_+$ and $D_-$. The USB standard also defines a single wire for providing a 5 V (volts) power signal labeled $V_{BUS}$. Devices connected to a USB host or a USB hub are allowed to draw a limited amount of power from the $V_{BUS}$. Therefore, the USB standard requires that each USB host and USB hub provide power for the USB devices connected thereto.

Initially, a USB device is only allowed to draw 100 mA from the $V_{BUS}$ power signal. However, it may request more current from the upstream USB host or USB hub in units of 100 mA up to a maximum of 500 mA. In practice, most ports will deliver the full 500 mA without any request before the port shuts down the power. Hence, if a USB device requires more power than the available 500 mA the device cannot operate until the user changes the network, either by rearranging USB connections or by adding external power resources. Typically, large USB devices, such as e.g. disk drives and printers, include their own power supplies and do not draw power from their USB connections. Smaller devices, on the other hand, may be partially or fully powered from their USB connections.

As already mentioned, the USB standard has become increasingly popular in connection with portable devices such as cell phones, personal digital assistants (PDAs), cameras and personal music players etc. Adding a USB port to a portable device makes it easy to upload and download information including names, phone numbers, calendars, photographs and music etc, which provides the possibility of increased portability.

Of particular interest in connection with the present invention is the possibility of utilizing a USB port and the $V_{BUS}$ power signal therein for charging the battery or similar power source in a portable device. This is especially convenient in connection with cell phones allowing the users to charge their cell phones at work, for example, without the use of specialized wall adapters. Among USB devices, chargers are somewhat anomalous since they use the USB connection for power and not for data transfer.

FIG. 1 shows a portable device in the form of a cell phone 10 comprising a display 22 and a key pad 12 as is well known in the art. The exemplifying cell phone 10 comprises a connector 14 arranged at its lower short end for connecting various peripheral devices, such as e.g. earphones, loudspeakers, chargers, photo flashes, external memory devices and even computers or similar. Almost every commercially available cell phone comprises a similar connector for connecting peripherals. In the given example the connector 14 is arranged as a so-called FastPort connector which is commonly used in many cell phones provided by the company Sony Ericsson. As can be seen in FIG. 1, the FastPort connector comprises twelve terminals 1-12.

FIG. 2a shows a table presenting the terminals 1-12 of the exemplifying FastPort connector 14 in FIG. 1. In this connection, terminals 1 and 9-12, which are singled out in FIG. 2a, are of special interest in connection with the present invention. Terminal 1 of the connector 14 is arranged to be connected to the above mentioned USB signal $V_{BUS}$ for receiving power from the USB host or USB hub as may be the case. Terminal 9 is arranged to be connected to the USB signal ground (GND), whereas terminal 10 and 11 are arranged to be connected to the USB data signals $D_+$ and $D_-$ respectively for communicating data between the USB and the cell phone 10.

However, the charging terminal 12 (Charge in) has no explicit relation to the USB terminals 1, 9, 10 and 11 of the connector 14, since it is arranged to draw charging power from an external power source for charging the battery or similar power source of the cell phone 10, i.e. the charging terminal 12 is not a part of the USB and the USB standard.

Before we proceed it should again be emphasized that the FastPort connector 14 describe above is merely an example. Other portable devices and other cell phones in particular may have other connectors comprising terminals arranged to be connected to the USB signals $V_{BUS}$, $D_-$, $D_+$ and GND respectively and a charging terminal being arranged to draw charging power from an external power source for charging a battery or similar power source in the portable device.

Even if a USB port can charge a USB device via the $V_{BUS}$ power signal as mentioned above, the $V_{BUS}$ signal cannot be safely connected to a charging terminal like the terminal 12 in the FastPort connector 14 of the cell phone 10. This is due to the fact that a charging port is generally adapted to draw the required amount of charging power from the charging source without considering the maximum 500 mA provided by the $V_{BUS}$. Hence, the required charging power may very well exceed 500 mA causing the $V_{BUS}$ to perform poorly, shut down, or even be overloaded. In other words, a cell phone 10 or a similar portable device having a charging terminal adapted to draw power from an external power source cannot be safely connected to the USB $V_{BUS}$, since the device may require a charging power that exceeds the power available from the $V_{BUS}$ causing the $V_{BUS}$ signal to shut down or malfunction or even cause the USB host or USB hub in question to be overloaded and possibly destroyed.

FIG. 2b shows a table of the signals for each terminal 1-4 in an ordinary USB connector. As can be seen, terminal 1 provides the USB signal $V_{BUS}$, terminal 2 the USB signal D_, terminal 3 the USB signal D_+ and terminal 4 the ground GND. There may be variations among the USB connectors. In case the numbering and layout etc varies the terminals 1-4 in a common USB connector as indicated in FIG. 2b applies *mutatis mutandis*.

FIG. 3 is a schematic illustration of an exemplifying ordinary USB-cable 300a arranged to operatively connect the cell phone 10 in FIG. 1 to a USB port. At one end the USB-cable 300a comprises a USB-connector for connecting the cable 300a to a mating USB connector of a USB host or a USB hub as may be the case. At the other end the USB-cable 300a comprises a phone-connector for connecting the cable 300a to the FastPort connector 14 of the cell phone 10 as described above. It should be emphasized that other USB-cables may have other phone-connectors or similar device-connectors that are adapted to be connected to connectors of other cell phones or similar portable devices for enabling an USB connection between the device and a USB host or USB hub.

As can be seen in FIG. 3, in the USB-cable 300a the USB-connector terminal 1 ($V_{BUS}$) is connected to the phone-connector terminal 1 (USB+5V), the USB-connector terminal 2 (D_) is connected to the phone-connector terminal 11 (USB DATA−), the USB-connector terminal 3 (D_+) is connected to the phone-connector terminal 10 (USB DATA+), and USB-connector terminal 4 (GND) is connected to the phone-connector terminal 9 (GND).

The exemplifying ordinary USB-cable 300a in FIG. 3 is not intended for providing a charging power from an external charger. Thus, the USB-cable 300a is not providing a connection to the charging input on terminal 12 (Charge in) in the phone-connector of the USB-cable 300a. As explained above, it is not safe to provide a connection from e.g. the $V_{BUS}$ power signal to a charging input as the charging input at terminal 12 (Charge in). Rather, in case the cell phone 100 is to be charged by a an external charger this is accomplished via a dedicated charging-cable 300b, as will be described in more detail below with reference to FIG. 4.

FIG. 4 is a schematic illustration of an exemplifying combined USB-and-charging set-up. The set-up comprises a desk stand 300c, a dedicated charging-cable 300b and the USB-cable 300a as discussed above. The desk stand 300c enables the cell phone 10 to receive charging power via the charging-cable 300b at the same time as it may communicate with other USB devices via the USB-cable 300a. To this end the desk stand 300c comprises a first cable-connector for connecting the phone-connector of the USB-cable 300a and a second cable-connector for connecting the phone-connector of the charging-cable 300b. The phone-connector of the charging-cable 300b and the phone-connector of the USB-cable 300a are preferably of the same type and both phone-connectors are preferably adapted to mate with the FastPort connector 14 of the cell phone 10 as described above with reference to FIGS. 1 and 2a. As is evident form FIG. 4, the phone-connector of the charging-cable 300b is arranged to connect to terminal 9 in the connector 14 for supplying ground (GND) from a charger to the cell phone 10, and arranged to connect to terminal 12 in the in the connector 14 for supplying a charging power from a charger to the cell phone 10.

Desk stands of the kind now described are commercially available (see e.g. the desk-stand CDS-60 from Sony Ericsson) and well known to those skilled in the art and they need no further description. The desk stand 300c illustrates one solution in which a USB-cable 300a is combined with a charging-cable 300b. Naturally, as is well known, the USB-cable 300a and the charging-cable 300b can also be used separately one at the time by connecting the phone-connector of the cables 300a, 300b respectively to the connector 14 of the cell phone 10 or together mechanically stacked if a mechanical stacking is allowed.

As is clear from the known solutions described above, USB cables are typically not used for connecting an external charger to a charging terminal of a portable device, e.g. such as the charging terminal 12 in the connector 14 of the cell phone 10. However, some countries have decided that portable devices and particularly cell phones provided in their country should be arranged to be charged by a proposed external charger with a USB-interface that provides charging power on the USB signal $V_{BUS}$ and a short circuit between the USB data signals D_+ and D_ to allow identification of this type of charger.

FIG. 5a is a schematic illustration of the exemplifying ordinary USB-cable 300a as discussed above now being connected to the proposed external charger. In FIG. 5 the signals in the USB-connector of the USB-cable 300a have been schematically connected to the terminals of the external charger by means of dashed lines. In addition, as can be seen in FIG. 5a, the USB data signals D_ and D_+ are connected to each other in the external charger via a short circuit 520.

Even though the ordinary USB-cable 300a is not intended for connecting an external charger to a charging terminal, e.g. as terminal 12 in connector 14 of the cell phone 10, a simple solution for achieving a charging function via the USB-cable 300a would seemingly be to provide an extra connecting wire between terminal 1 ($V_{BUS}$) of the USB connector and terminal 12 (Charge in) of the phone connector in USB-cable 300a. However, if a USB-cable modified in this way is accidentally used for connecting the cell phone 10 or similar portable device to an ordinary USB host or USB hub, the cell phone 10 or similar may draw an amount of power from its charging terminal 12 that exceeds the amount available from the $V_{BUS}$ of the USB host or USB hub. In that case the $V_{BUS}$ power signal may shut down or malfunction and the USB host or USB hub may even be overloaded and possibly destroyed. Hence, this is not a safe solution.

Another solution may be to adapt the cell phone 10 or similar portable device to only draw full charging power from the proposed external charger via the $V_{BUS}$ when the device senses the short circuit 520 in the proposed external charger. However, even if this may be a future solution many existing USB devices, such as older cell phones and other older portable devices, are not adapted to receive full charging power via the $V_{BUS}$. Hence, this solution is not compatible backwards with older existing USB devices such as older cell phones and other portable USB devices. In addition, the necessary adaptation of the cell phone 10 or similar portable USB device requires additional circuitry and possibly additional software which is costly and which may malfunction.

Still another solution may be to provide a cable for the proposed external charger with intelligent circuitry being arranged to operatively sense the short circuit 520 in the proposed charger and temporarily connect terminal 1 ($V_{BUS}$) of the USB connector to terminal 12 (Charge in) of the phone-connector in USB-cable 300a. However, this requires additional circuitry which is costly and which may malfunction.

In view of the above there seems to be a need for an improved external charging via an charging-cable with an USB like connector, which charging requires a minimum of extra circuitry and/or software and which guaranties none or minimum damages and/or malfunctions if the charging-cable is accidentally utilized in an ordinary USB connector.

SUMMARY OF THE INVENTION

The present invention is intended to solve the problem of providing an improved external charging via a charging-cable with an USB like connector, which charging requires a minimum of extra circuitry and/or software and which guaranties none or minimum damages and/or malfunctions if the charging-cable is accidentally utilized in an ordinary USB connector.

Thus, one object of the invention is to provide an improved external charging via a charging-cable with an USB like connector, which charging requires a minimum of extra circuitry and/or software and which guaranties none or minimum damages and/or malfunctions if the charging-cable is accidentally utilized in an ordinary USB connector.

This object is achieved according to a first aspect directed to a charging-cable comprising a charger-connector for connecting the charging-cable arrangement to a mating USB connector in a charger, and a device-connector for connecting the charging-cable to a portable electronic device, wherein the charger-connector comprises USB-terminals arranged so that a first USB-terminal can connect to the $V_{BUS}$ signal, a second USB-terminal can connect to the $D_-$ signal, a third USB-terminal can connect to the $D_+$ signal and a fourth USB-terminal can connect to the ground signal of a USB connector; and wherein the device-connector comprises device-terminals arranged to be operatively connected to said portable device so that a first device-terminal connects to a ground terminal and a second device-terminal connects to a charging terminal of said portable device.

The charging-cable is characterized in that: the first USB-terminal is connected to one of the second or third USB-terminals via a first circuit so that the first USB-terminal can be operatively connected to the other of said second or third USB-terminals when the charger-connector is connected to an external charger comprising a second circuit that connects the second USB-terminal to the third USB-terminal; and in that said other of the second or third USB-terminals is connected to the second device-terminal via a third circuit so that the first USB-terminal can be operatively connected to the charging terminal of the portable device via said first, second and third circuits.

A second aspect is directed to a charging-cable comprising the features of the first aspect and characterized in that the charger-connector for connecting the charging-cable is arranged to be connected to an USB-socket or USB-plug arrangement of a charger.

A third aspect is directed to a charging-cable comprising the features of the first aspect and characterized in that the device-connector for connecting the charging-cable is arranged to be connected to a socket or plug arrangement of a portable electronic device.

A fourth aspect is directed to a charging-cable comprising the features of the third aspect and characterized in that the socket or plug arrangement of the portable device is a FastPort.

A fifth aspect is directed to a charging-cable comprising the features of the first, second, third or fourth aspect and characterized in that the portable device is a cell phone or cell phone accessory, e.g. Bluetooth headset or a desk stand or similar.

A sixth aspect is directed to a charging-cable comprising the features of the first, second, third, fourth or fifth aspect and characterized in that the portable device is an USB-device.

Further advantages of the present invention and embodiments thereof will appear from the following detailed description of the invention.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasised that any methods defined by the appended claims may comprise further steps in addition to those mentioned therein. Moreover, the steps in the claims may be performed in another order than the order in which they are mentioned in the claims without departing from the present invention.

BRIEF DESCRIPTION OF THE DRAWINGS

FIG. 2a shows a table presenting the signals of special interest in the connector 14 shown in FIG. 1

FIG. 2b shows a table of the signals for the terminals in an ordinary USB connector.

FIG. 3 is a schematic illustration of an exemplifying ordinary USB-cable 300a.

DETAILED DESCRIPTION OF PREFERRED EMBODIMENTS

The present invention is directed to power supply of portable devices. Particular aspects of the invention are directed to power supply of portable devices via a USB-like cable. Even more particular aspects are directed to the charging of a power source in a portable device via a USB-like cable.

Preferred embodiment of the present invention will be described below with reference to the accompanying drawings.

Figure 5A:
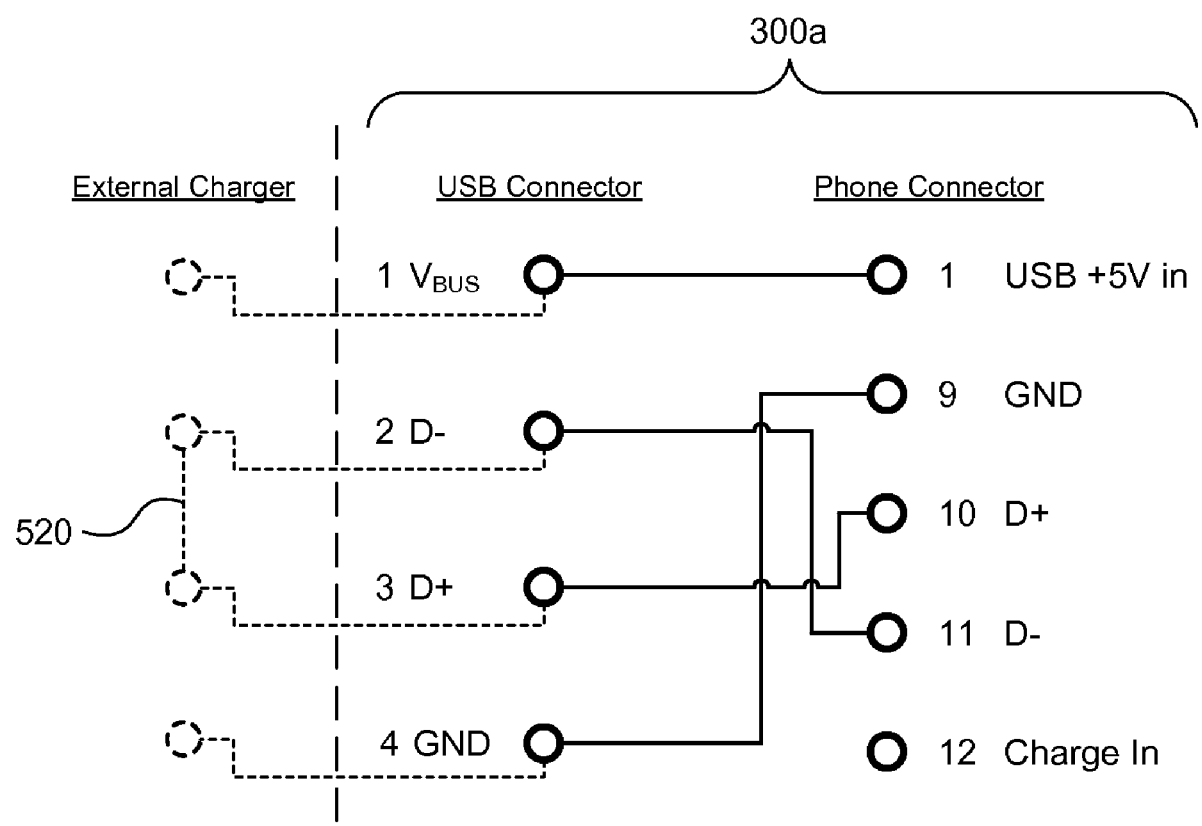
FIG. 5a is a schematic illustration of the exemplifying ordinary USB-cable 300a being connected to the proposed external charger.
Figure 5B:
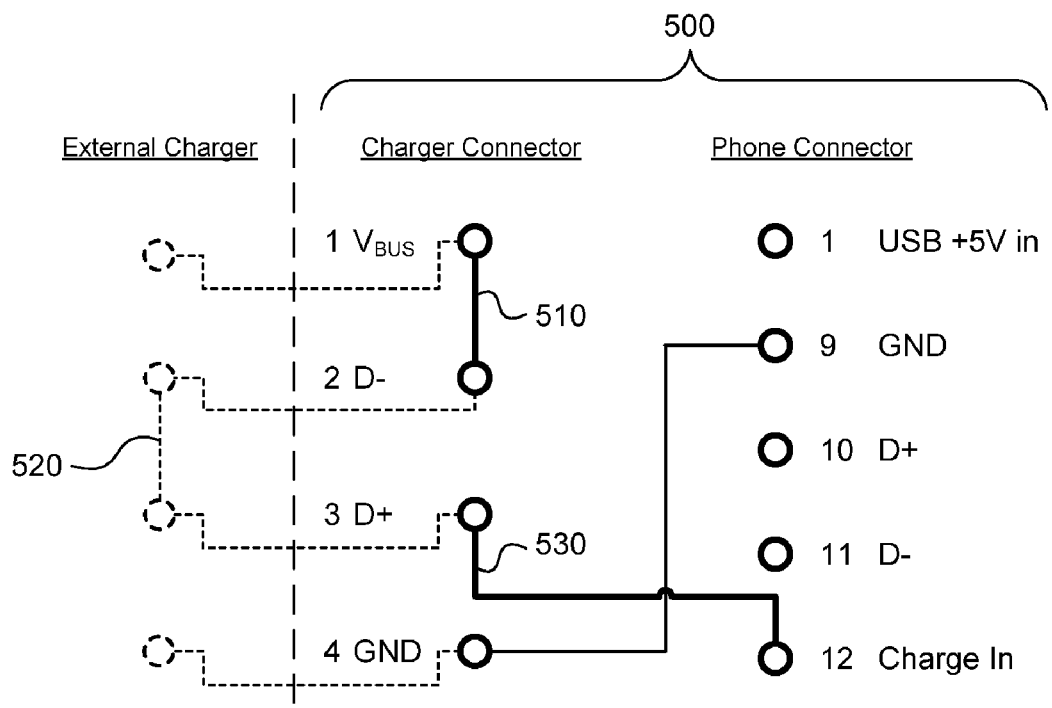
FIG. 5b is a schematic illustration of an exemplifying charging-cable 500 provided with a USB-like charger-connector according to an embodiment of the present invention.

FIG. 5b is a schematic illustration of an exemplifying charging-cable 500 according to an embodiment of the present invention. The charging-cable 500 is arranged to operatively connect an external charger to a portable device (e.g. a cell phone 10). The external charger is provided with a USB-like interface that provides charging power on the USB signal $V_{BUS}$ and a short circuit between the USB data signals $D_+$ and $D_-$ so as to allow an identification of this type of charger.

At one end the charging-cable 500 comprises a USB-like charger-connector for connecting the cable 500 to a mating USB-like connector in the external charger. The USB-like charger-connector of the cable 500 is preferably an ordinary USB connector arranged to connect with a mating USB connector of an ordinary USB host or USB hub. However, the terminals in the USB-like charger-connector of the charging-cable 500 are connected in another manner, as will be describe in more detail below.

Figure 1:
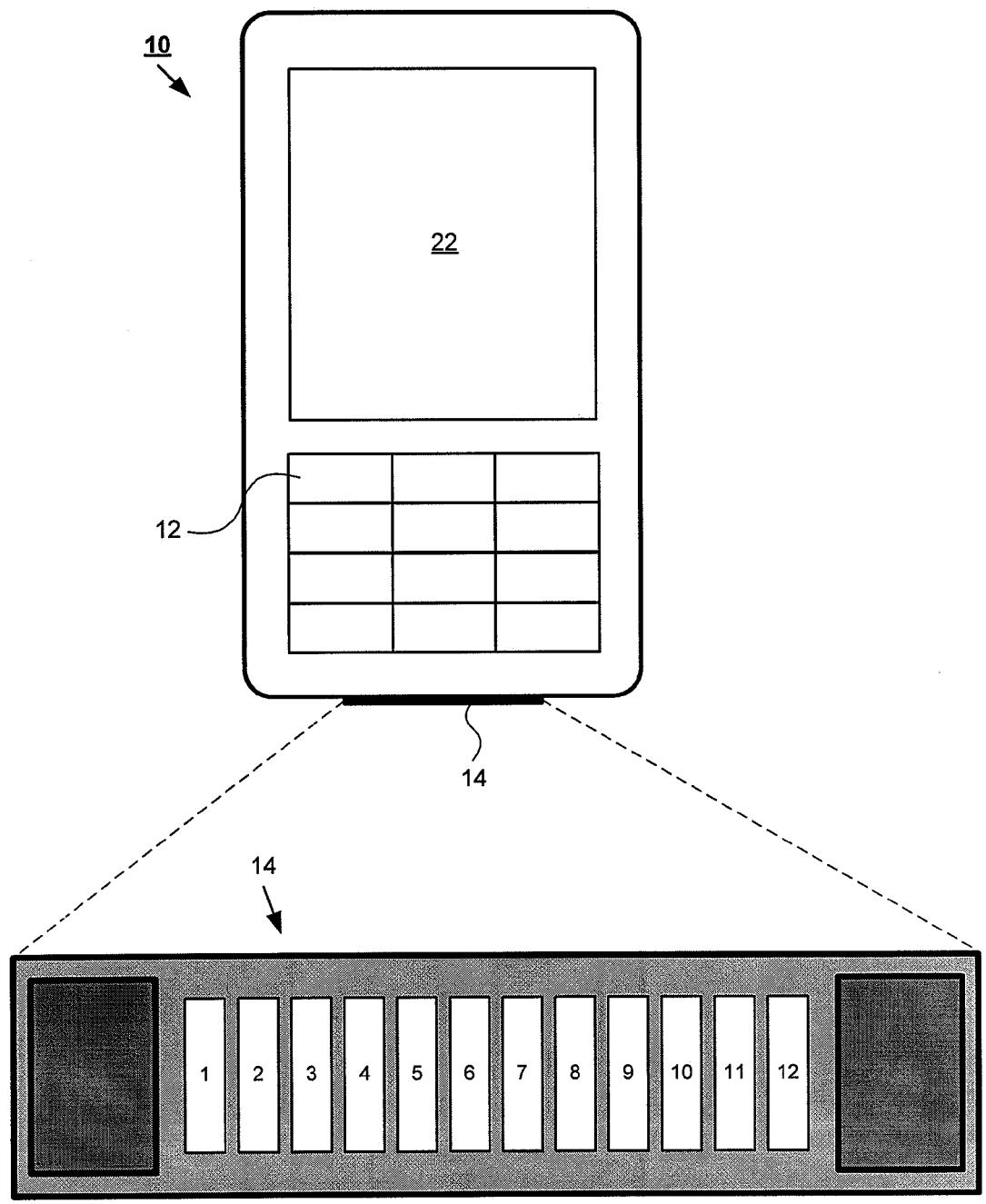
FIG. 1 shows a portable device in the form of a cell phone 10 provided with an exemplifying FastPort connector 14 for connecting peripheral devices.
Figure 3:
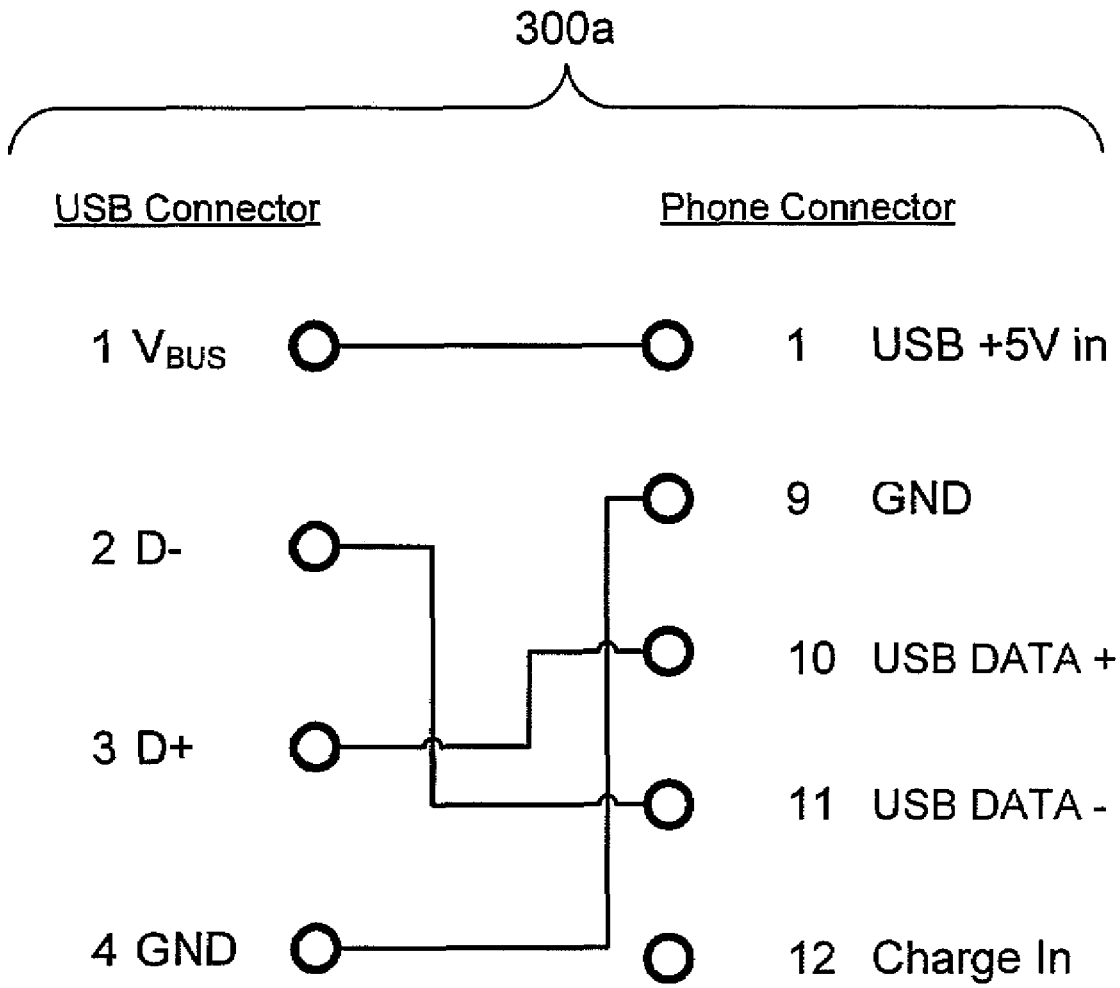
Figure 4:
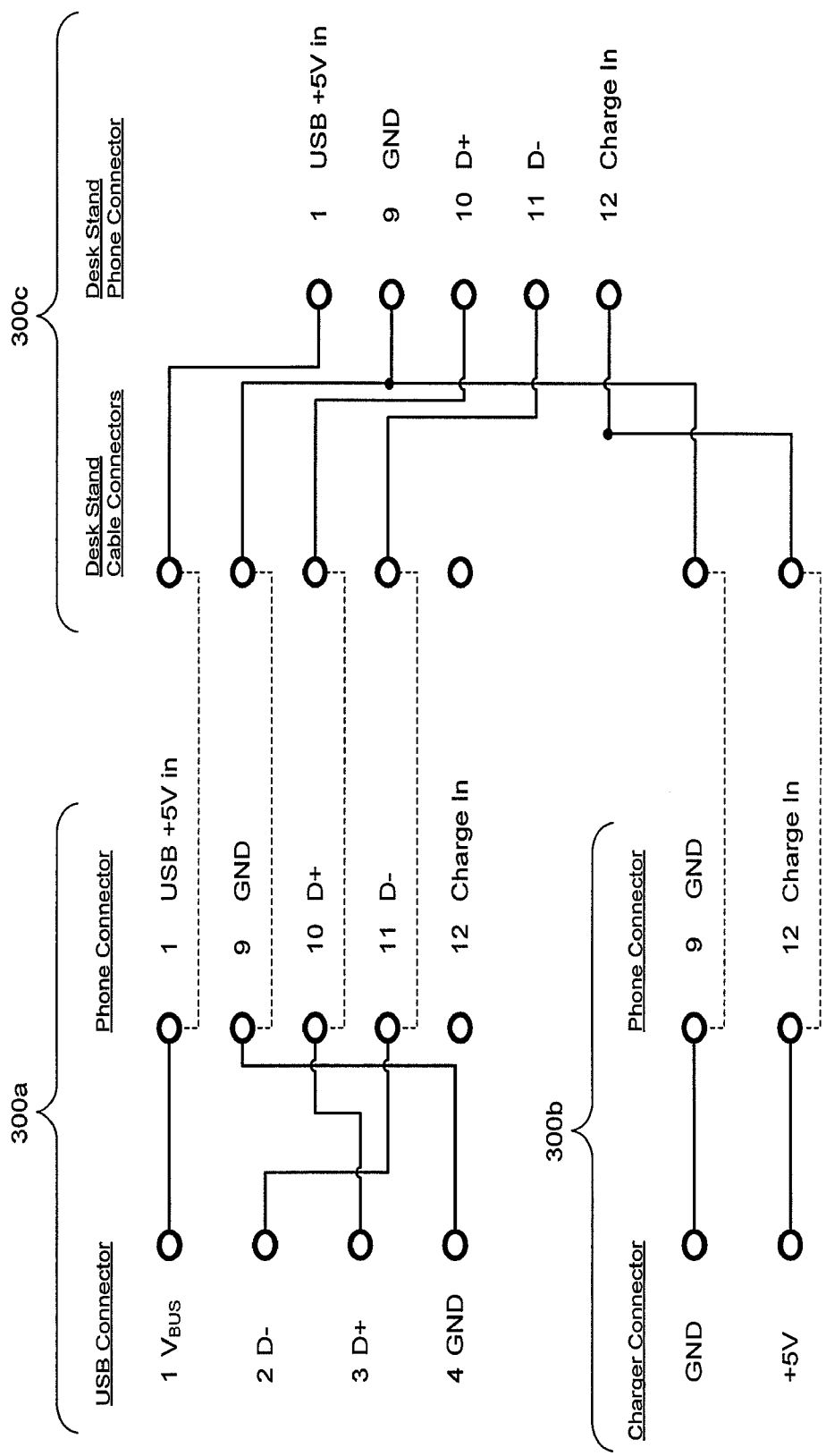
FIG. 4 is a schematic illustration of an exemplifying combined USB-and-charging set-up.

At the other end the charging-cable 500 comprises a device-connector for connecting the cable 500 to a portable device to be charged. The portable device is preferably a cell phone 10 as discussed above with reference to FIGS. 1 and 2a-2b. Hence, it is preferred that the device-connector of the charging-cable 500 is a phone-connector. It is even more preferred that the phone-connector of the charging-cable 500 is a FastPort connector that is arranged to mate with a FastPort connector 14 in the cell phone 10 as described above with reference to FIGS. 1 and 2a-2b.

However, it should be emphasized that other embodiments of the charging-cable 500 may have other phone-connectors or similar device-connectors arranged to be connected to other cell phones or other portable devices for enabling the cell phone or the other device to be charged by an external charger via the charging-cable 500.

As can be seen in FIG. 5b, the charger-connector of the charging-cable 500 is arranged so that terminal 1 ($V_{BUS}$) is connected to terminal 2 (D_) via a first short-circuit 510. In addition, terminal 3 (D_+) of the charger-connector is connected to the charging terminal 12 (Charge in) of the FastPort phone-connector via another circuit 530. Terminal 4 (GND) of the charger-connector is connected to terminal 9 (GND) of the phone-connector as in the ordinary USB-cable 300a described above. Moreover, as can be seen in FIG. 5b, the external charger comprises a short-circuit 520 that connects the USB signal D_ to the USB signal D_+ when the charger-connector of the charging-cable 500 is connected to (e.g. inserted in) the external charger.

From the above the observant reader realizes that the charging power provided by the external charger on the charger-connector terminal 1 ($V_{BUS}$) will be routed—via the first short-circuit 510, the second short-circuit 520 and the circuit 530—to the charging terminal 12 (Charge in) in the FastPort phone-connector of the charging-cable 500, and thus to the charging terminal 12 (Charge in) in the FastPort connector 14 of the cell phone 10 as described above.

Figure 5C:
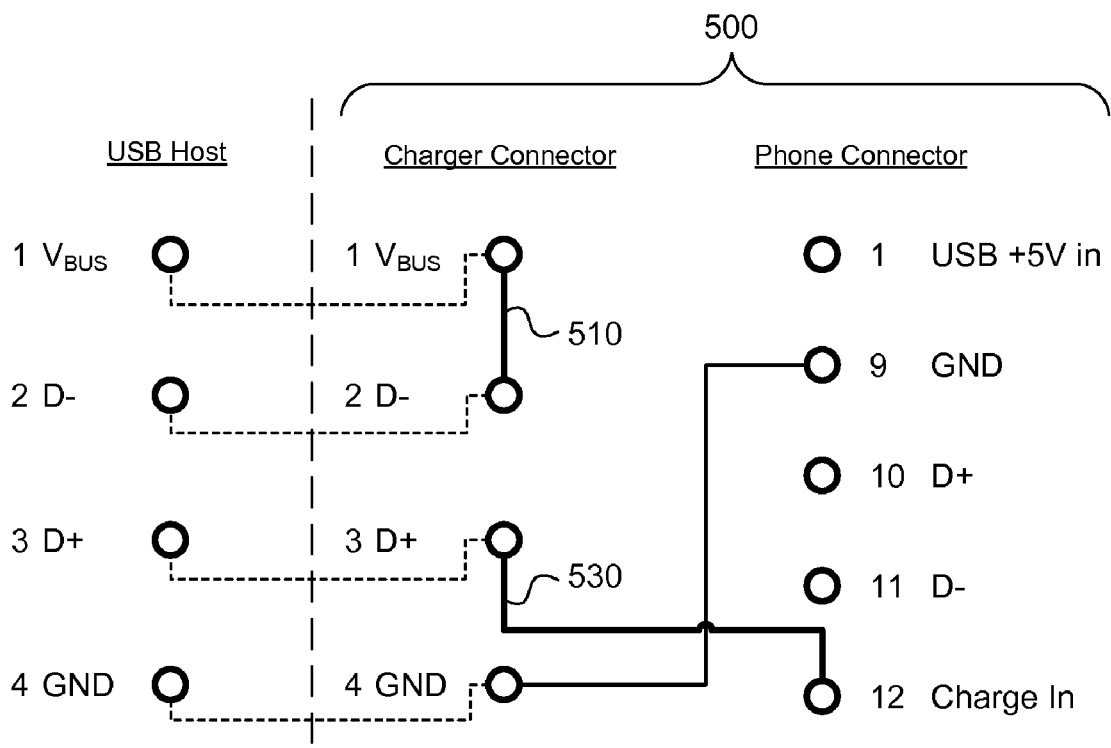
FIG. 5c is a schematic illustration of the charger-connector of the charging-cable 500 in FIG. 5b being connected to a USB connector of an ordinary USB host.

FIG. 5c is a schematic illustration of the exemplifying charging-cable 500 described above being accidentally connected to (e.g. inserted in) a mating USB connector of an ordinary USB host. As can be seen in FIG. 5c the short-circuit 510 in the charging-connector of the charging-cable 500 connects terminal 1 of the USB-host comprising the USB signal $V_{BUS}$ to terminal 2 comprising the USB data signal D_. In other words, the $V_{BUS}$ power signal will be provided to the data signal D_. However, this is within the boundaries of the USB specification. In fact, the USB host will not be affected negatively by the $V_{BUS}$ power signal being connected to any of the data signals D_, D_+.

More important, a USB host or similar does not comprise any short-circuit between the USB data signals D_ and D_+ as in the external charger comprising the short-circuit 520 as described above. Hence, as shown in FIG. 5c, if the USB-connector of the charging-cable 500 is accidentally connected to a mating USB connector of a USB host or a USB hub as may be the case, there is no risk that terminal 1 ($V_{BUS}$) is connected to the charging terminal 12 (Charge in) in the FastPort phone-connector of the cell phone 10. In other words, there is no risk that the cell phone 10 will draw any charging power from the $V_{BUS}$ signal via the charging-cable 500 when it is connected to an ordinary USB host or USB hub. Hence, the $V_{BUS}$ signal will not shut down or malfunction and the USB host or USB hub in question will not be overloaded and destroyed.

With reference to FIGS. 5b and 5c the discussion above can be summarized in that the charging-cable 500 comprises a charger-connector for connecting the charging-cable 500 to a mating USB connector in an external charger. In addition, the charging-cable 500 comprises a device-connector (e.g. a phone connector) for connecting the charging-cable 500 to a portable device. The charger-connector of the cable 500 comprises a plurality of USB-terminals arranged so that a first USB-terminal can be connected to the $V_{BUS}$ signal, a second USB-terminal can be connected to the D_ signal, a third USB-terminal can be connected to the D_+ signal and a fourth USB-terminal can be connected to the ground signal of a USB. In turn, the device-connector comprises a plurality of device-terminals arranged so as to be operatively connected to said portable device so that a first device-terminal connects to a ground terminal and a second device-terminal connects to a charging terminal of said portable device. Moreover, as can be seen in FIG. 5b the first USB-terminal ($V_{BUS}$) is connected to the second USB-terminal (D_) via a first short-circuit 510 so that the first USB-terminal ($V_{BUS}$) can be operatively connected to the third USB-terminal (D_+) when the charger-connector of the charging-cable 500 is connected to an external charger comprising a second short-circuit 520 that connects the second USB-terminal (D_) to the third USB-terminal (D_+). In addition, the third USB-terminal (D_+) is connected to the second device-terminal of the device-connector via a third circuit 530 so that the first USB-terminal ($V_{BUS}$) is operatively connected to the charging terminal of the portable device via said first, second and third circuits 520, 510, 530.

Figure 5D:
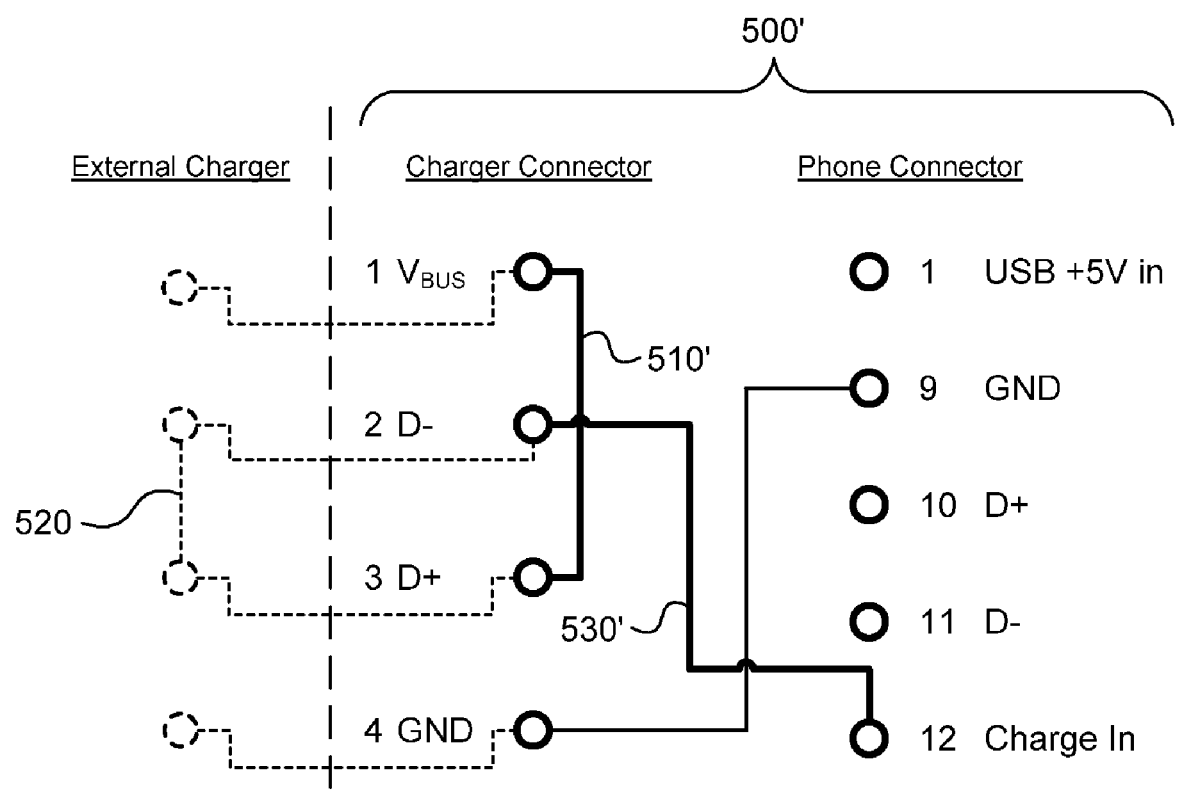
FIG. 5d is a schematic illustration of another exemplifying charging-cable 500' according to another embodiment of the present invention.

FIG. 5d shows another embodiment according to which the charging-cable 500 has been modified to form an alternative charging-cable 500' wherein terminal 1 ($V_{BUS}$) in the charging-connector is connected to terminal 3 (D_+) of the USB-connector via a first short-circuit 510' and terminal 2 (D_) in the charging-connector is connected to the charging terminal 12 (Charge in) of the FastPort phone-connector of the charging-cable 500' via another circuit 530'. As before, the external charger comprises a second short-circuit 520 that connects the second USB-terminal (D_) to the third USB-terminal (D_+) when the charging-connector of the charging-cable 500' is connected to the external charger.

The present invention has now been described with reference to exemplifying embodiments. However, the invention is not limited to the embodiments described herein. On the contrary, the full extent of the invention is only determined by the scope of the appended claims.

The invention claimed is:

1. A charging-cable comprising
a charger-connector for connecting the charging-cable to a mating USB connector in a charger; and
a device-connector for connecting the charging-cable to a portable electronic device, where the charger-connector comprises USB-terminals arranged so that:
a first USB-terminal is adapted to connect to a $V_{BUS}$ signal of a USB connector,
a second USB-terminal is adapted to connect to a D_ signal of the USB connector,
a third USB-terminal is adapted to connect to a D_+ signal of the USB connector, and
a fourth USB-terminal is adapted to connect to a ground signal of the USB connector; and
where the device-connector comprises device-terminals arranged to be operatively connected to the portable electronic device so that a first device-terminal connects to a ground terminal and a second device-terminal connects to a charging terminal of the portable electronic device, where:

the first USB-terminal is connected to one of the second or third USB-terminals via a first circuit so that the first USB-terminal can be operatively connected to the other of the second or third USB-terminals when the charger-connector is connected to an external charger comprising a second circuit that connects the second USB-terminal to the third USB-terminal; and the other of the second or third USB-terminals is connected to the second device-terminal via a third circuit so that the first USB-terminal can be operatively connected to the charging terminal of the portable electronic device via the first, second and third circuits.

2. The charging-cable in claim 1, where the charger-connector for connecting the charging-cable is arranged to be connected to an USB-socket or USB-plug arrangement of a charger.

3. The charging-cable in claim 1, where the device-connector for connecting the charging-cable is arranged to be connected to a socket or plug arrangement of a portable electronic device.

4. The charging-cable in claim 3, where the socket or plug arrangement of the portable device is a FastPort.

5. The charging-cable of claim 1, where the portable electronic device is a cell phone or cell phone accessory.

6. The charging-cable of claim 1, where the portable electronic device is an USB-device.

* * * * *